Patented Jan. 5, 1926.

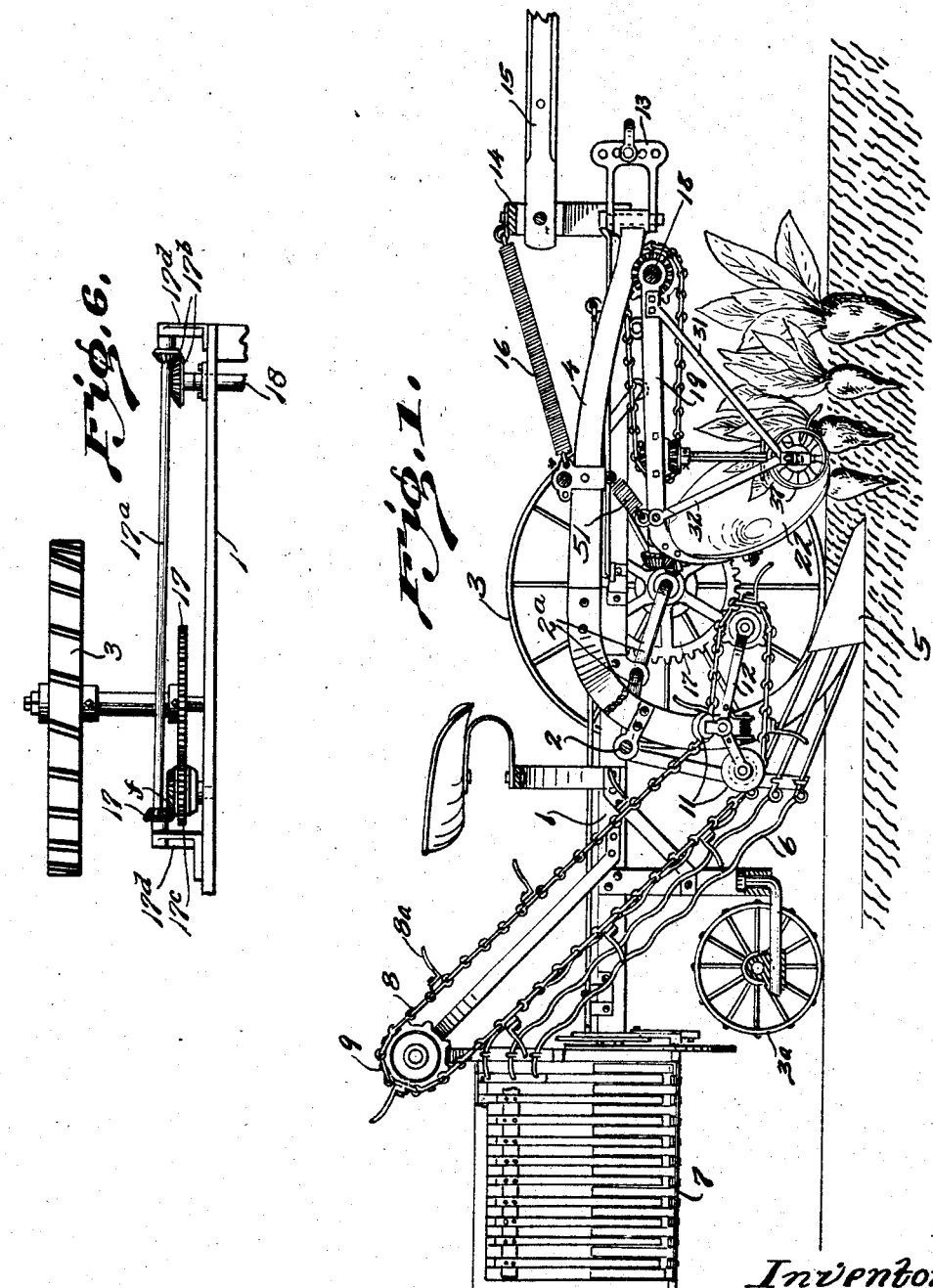

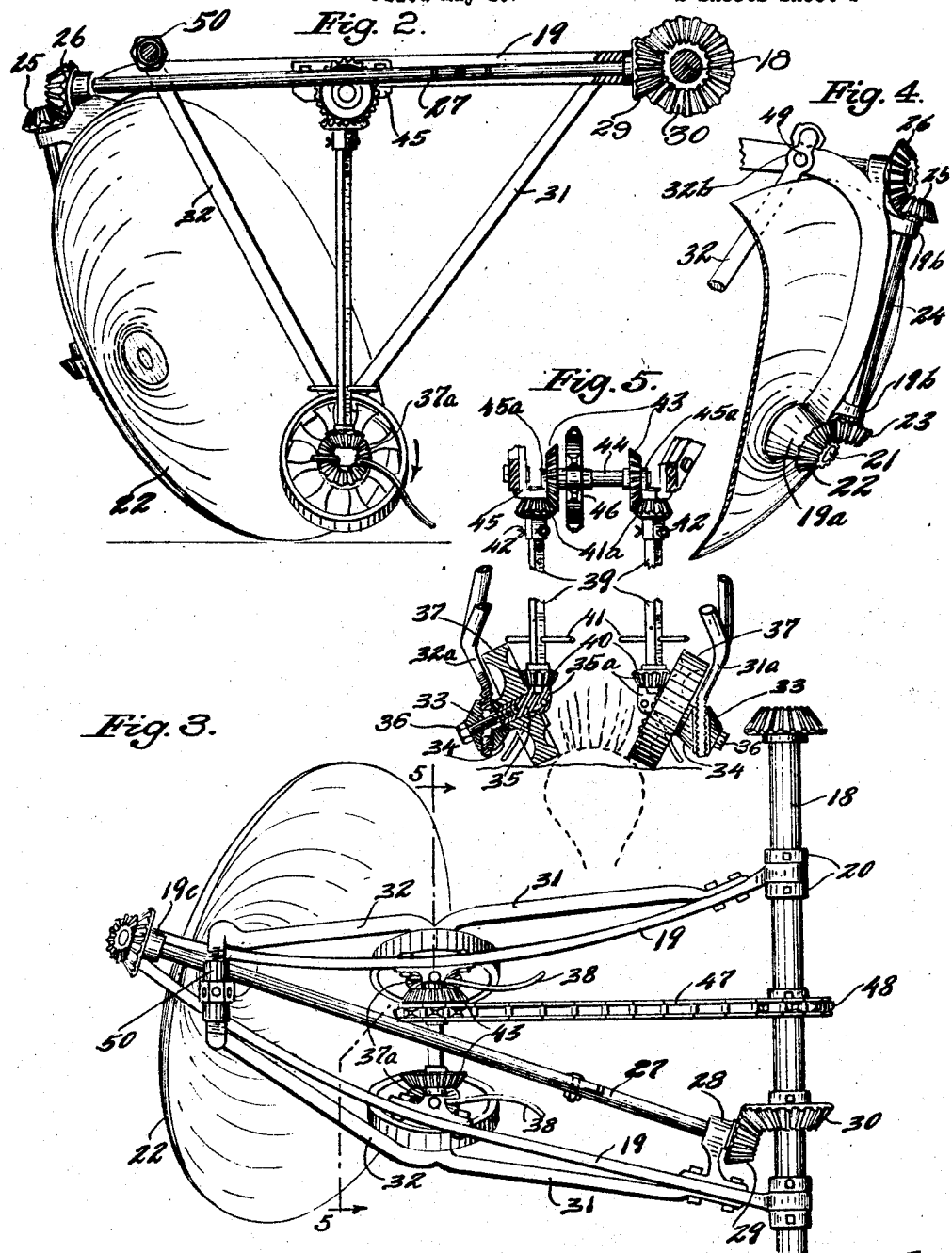

1,568,811

UNITED STATES PATENT OFFICE.

ADOLPH F. DJUBERG, OF MINNEAPOLIS, MINNESOTA.

BEET TOPPER.

Application filed May 19, 1924. Serial No. 714,386.

*To all whom it may concern:*

Be it known that I, ADOLPH F. DJUBERG, a citizen of the United States, residing at Minneapolis, in the county of Hennepin and State of Minnesota, have invented certain new and useful Improvements in Beet Toppers; and I do hereby declare the following to be a full, clear, and exact description of the invention, such as will enable others skilled in the art to which it appertains to make and use the same.

This invention relates to a harvesting machine and particularly to a machine for harvesting root crops such as sugar beets. The machine on which the present invention is used comprises a wheel-supported frame having mounted thereon an auxiliary swinging frame, which auxiliary frame carries a dish-shaped cutter disposed in a substantially upstanding position with its axis making an angle of forty-five degrees, or less, with the horizontal, together with means for rotating said disk and controlling the height thereof, in accordance with the height of the beets.

It is an object of this invention to provide a simple and improved form of supporting and rotating such a cutter, together with improved means for controlling the height thereof.

It is a further object of the invention to provide a means for controlling the height of the cutter comprising a pair of disk rollers bearing on the ground in front of the cutter and adapted to pass at each side of the center of the beets and ride over the beet top.

It is another object of the invention to provide means for varying the distance between said rollers as well as varying the distance between the lowermost points thereof and the lowermost point on said cutter.

It is still further an object of the invention to provide a beet harvester having a wheel-supported main frame, a transverse shaft carried therein adjacent its front end, on which shaft is mounted a vertically swinging auxiliary frame, which auxiliary frame carries the cutter as well as gearing driven from said shaft for rotating said cutter, said gearing being connected to said cutter at the rear thereof.

It is more specifically an object of the invention to provide such a beet harvester having a main frame and a swinging auxiliary frame, as above set forth, carrying a dish-shaped cutter, which cutter has an axle shaft secured thereto and projecting at its rear, said shaft being geared to another shaft extending vertically at the rear of the cutter, which latter shaft is, in turn, geared to a shaft carried by the auxiliary frame which extends forward to and is geared to the transverse shaft carried by the main frame.

These and other objects and advantages of the invention will be fully set forth in the following description made in connection with the accompanying drawings in which like reference characters refer to the same parts throughout the different views, and in which Fig. 1 is a view in longitudinal central vertical section through the machine, a portion thereof being shown in side elevation;

Fig. 2 is a longitudinal vertical section taken through the front portion of the machine;

Fig. 3 is a plan view of the front portion of the machine showing the auxiliary frame and parts carried thereby;

Fig. 4 is a partial view in rear elevation of the cutter and auxiliary frame;

Fig. 5 is a vertical section taken on the line 5—5 of Fig. 3, as indicated by the arrows, Figs. 2 to 5 being shown on an enlarged scale; and Fig. 6 is a partial plan view as seen from the top of Fig. 1.

Referring to the drawings, particularly to Fig. 1, a beet harvesting machine is shown comprising a main frame having longitudinal side members 1 in which are journaled a transverse shaft member 2 formed as a crank between said frames and having crank shaft arms 2ª, the outer ends of which carry the supporting wheels 3. The shaft 2 between the frame members 1, carries the beam 4 having at its front lower end digging blades 5. A chute formed of spaced rods 6 is connected to the rear of the blades 5 and extends upwardly and rearwardly to a beet carrier and dump 7, an endless conveyor belt 8 having prongs or arms 8ª thereon co-operating with the chute 6 to move the raised beets upwardly and rearwardly into the carrier 7, said conveyor running over a sprocket 9 in its upper end carried on the main frame and over a sprocket 10 at its lower end, which, with its pulley 11, is carried on a swinging fork 12 mounted on the beam 4. The beam 4 is provided with an adjustable clevis 13 in its forward end and the main frame has a yoke 14 at its forward end to which is pivotally connected a tongue 15; said yoke being connected to the beam 4 by a heavy tension spring 16. The main frame is also supported by a pair of caster wheels 3ª.

The wheel 3 is connected to a gear 17 which, in turn, is geared through gear 17ᶜ and bevel gears 17ᶠ to a longitudinal shaft 17ª extending along the outside of the frame member 1 and journaled in bearings 17ᵈ, which shaft extends forward and is geared through bevel gears 17ᵇ to a shaft 18 extending transversely of the main frame and journaled in the side members 1 thereof, adjacent their forward ends. The shaft 18 has hung or journaled thereon an auxiliary frame comprising spaced members 19 having hubs at their forward ends embracing the shaft 18, which hubs are held in proper position by collars 20 at each side thereof secured to the shaft 18 by suitable set screws. As shown in Figs. 1, 2 and 3, the members 19 extend rearwardly from the shaft 18 substantially horizontally and are connected at their rear ends and then extend downwardly in curved formation and are provided with a hub 19ª. A shaft 21 is journaled in the hub 19ª and has secured thereto at the forward side of the hub a dish-shaped, disk-like cutter 22. The axis of the shaft 21 extends at an angle of 45 degrees, or less, to the horizontal so that the cutter 22 is disposed in upstanding position with the plane of its edge disposed at an angle of 45 degrees, or less, with the vertical and the axis of shaft 21 also extending at an acute angle to the longitudinal axis of the main frame. The shaft 21 at the outer side of hub 19ª carries a beveled gear 22 with which meshes another beveled gear 23 secured to the lower end of a shaft 24 journaled in bearings 19ᵇ projecting rearwardly from the rear of the connected portion of members 19. The shaft 24 carries a beveled gear 25 at its upper end meshing with another beveled gear 26 carried on the rear end of a shaft 27, supported in a hub 19ᶜ disposed substantially at the meeting point of members 19. The shaft 27 extends forwardly in a direction inclined to the longitudinal axis of the machine and substantially horizontally and is journaled at its front end in a bearing 28 secured to one of the members 19. Said shaft 27 further has a beveled gear 29 at its front end meshing with a beveled gear 30 secured to shaft 18. From the above description it will be seen that the cutter 22 is positively driven from the shaft 18.

The members 19 each have arms 31 and 32 secured thereto, which arms project downwardly in an inclined direction, the arms 31 and 32 connected to one of the members 19 meeting in a common portion 31ª and the arms 31 and 32 connected to the other member 19 meeting on a common portion 32ª, as shown in Figs. 1 and 5. The lower ends of the members 31ª and 32ª extend towards each other a short distance and then are disposed in vertical parallel relation, said vertical portions being formed at each side with corrugations or teeth, as shown in Fig. 5. Outer block or bearing members 33 and inner block or bearing members 34 are secured to the members 31ª, 32ª, and said inner blocks 34 are apertured or bored to receive the ends of cylindrical journal members 35, said journal members having enlarged heads 35ª at their inner sides formed with vertically disposed recesses, said heads also having shouldered extensions about the cylindrical portions thereof. The members 33 and 34 are held in clamping relation against the members 31ª and 32ª by threaded bolts or cap screws 36 threaded into the outer ends of the journal members 35. Rollers 37 are carried and journaled on the members 35 and have central hub portions contacting the blocks 34 at their outer sides and the shoulder on the heads 35ª at their inner sides. The members 33 and 34 can thus, with screws 36, be vertically adjusted and secured in different vertical positions on members 31ª and 32ª. It will be noted that the axes of the members 35 are inclined to the horizontal so that the rollers 37 are also inclined and extend outwardly away from each other. Each member 35 also carries in its head portion 35ª a rod 38 extending forwardly from said head portion in substantially horizontal position and then being curved downwardly and slightly outwardly at its forward end. The recesses in the tops of the heads 35 form bearings for the lower ends of a pair of rods or angularly shaped shafts 39 which extend upwardly in spaced parallel relation and which have beveled gears 40 secured thereto at their lower ends adjacent the heads 35ª, said beveled gears 40 meshing with beveled gears 37ª formed on the inner faces of the hubs of the rollers 37. The shafts 39 also have secured therein and extending transversely at each side thereof adjacent the gears 40 rods 41. The shafts 39 are provided with a plurality of spaced transverse holes 39ª adjacent the top portions and hub-equipped beveled gears 41ª have longitudinal openings therethrough fitting the shafts 39ª and are adapted to be held thereon by cotter pins 42 extending through their hubs and one of the openings 39ª. The gears 41ª can thus be vertically adjusted to suit the adjustment of rollers 37. The beveled gears 41ª mesh with beveled gears 43 secured adjacent the ends of a shaft 44, the ends of which shaft are journaled in upstanding bearings 45ª which are part of the bearings 45 bolted to the arms 19 and having apertures therein forming the bearings for the upper ends of the shafts 39. The shaft 44 has secured thereto a sprocket wheel 46 over which passes a chain 47 also passing over and driven by a sprocket wheel 48 secured to shaft 18. The arms 32 which are rigidly connected to the arms 31, have hub enlargements 32ᵇ thereon adjacent their upper ends embracing pins 49 projecting outwardly from the arms 19, the ends of members 32 extending over the arms 19 and being threaded in reverse directions, or, in other words, with right and left hand threads, said threaded ends of the members 32 being adjustably connected by a turn buckle 50.

The auxiliary frame with cutter 22, rollers 37 and associated parts is suspended from beam 4, and yieldingly supported by a strong tensile coiled spring 51.

In operation, the harvester is drawn along by a suitable traction means, the main frame being supported on wheels 3 and 3ᵃ. The shaft 18 is driven, as stated, from the wheels 3 and the cutter 22 and the rollers 37 are positively rotated. The shaft 18 is driven from the wheels 3 in a clock-wise direction as seen from the right side of the machine and the rollers 37 are thus driven with their lower portions moving rearwardly. The auxiliary frame swings downwardly supported by spring 51 and the rollers 37 move adjacent the ground rolling in front of the cutter 22. The machine will be guided so that the rollers 37 pass at each side of the beet or beet row, as shown in Fig. 5. The beets do not stand at a uniform height but some beets project out of the ground more than others. As the machine approaches the beet the rollers 37 roll over the crown thereof at each side of the center of the beet and as these rollers are quite close to the lower front cutting edge of the cutter 22, they will raise or lower said cutting edge, according to the height of the beet, so that substantially the same amount of top will be cut from each beet. In order to get the correct control of the cutter, it is necessary to have cutters standing in the position described and it is also necessary to have the rollers 37 quite close to the forward cutting edge. As the machine passes over the beet, any of the beet leaves which may be drooping near the ground will be lifted by the rods 38 and moved upwardly and inwardly between said rods and the tops will be moved rearwardly by the arms 41 so that the tops will be effectively engaged by the cutter 22.

It will be seen that the rollers 37 can be adjusted vertically in relation to the lowermost point of the cutter 22 by loosening the bolts 36 and moving the blocks 33 and 34 upwardly or downwardly on the members 31ᵃ and 32ᵃ. When such adjustment is made the shafts 39 will be adjusted vertically by movement of the gears 41 at the tops thereof and disposition of the cotter pins 42 in other of the holes 39ᵃ. The rollers 37 can also be brought nearer together or farther apart by adjustment of the arms 31 and 32, as well as the arms 19. The arms 32 can be drawn together or separated at their rear end by means of the turn buckle 50 and the arms 19 and 31 can be moved together or separated at their front ends by adjustment of the collars 20. One of the gears 43 will, of course, have to be secured in different positions on shaft 44 to properly keep gears 43 and 41ᵃ in mesh. In practice, the length of the shaft 44 and its extent of bearing in bearings 45ᵃ, as well as the diameter of the pinions 41ᵃ, will be so proportioned that the ends of shaft 44 will not interfere with the vertical adjustment of shafts 39. The shaft 27, as shown, is preferably made of longitudinally adjustable sections to accommodate this adjustment of the arms 31, 32 and the arms 19. The rollers 37 can thus be adjusted to suit different sized beets. As the machine is progressed, therefore, the tops will be brought into proper position to be effectively severed by the cutter 22 and these tops will be gathered, as disclosed in the machine of applicant's co-pending application Serial Number 641,621, filed May 26, 1922. The beets in the ground will be raised by the blades 15 and disposed in the carrier 7. This part of the machine, however, forms no part of the present invention.

From the above description it is seen that applicant has provided a simple and improved means for carrying and driving the cutter 22 and for controlling the height of the cutter, according to the height of the beets. The parts are all positively supported and the cutter and controlling rollers are positively driven. The machine is capable of the desired adjustment and when adjusted, is maintained in rugged and serviceable condition.

It will, of course, be understood, that various changes may be made in the form, details, arrangement and proportions of the parts without departing from the scope of applicant's invention, which, generally stated, consists in a device capable of carrying out the objects above set forth, such as shown and described and defined in the appended claims.

What is claimed is:

1. A beet harvesting machine having in combination, a dish-shaped cutter having its axis disposed at an angle of 45 degrees or less to the horizontal, a frame carrying said cutter, and a pair of spaced rollers carried by said frame disposed in front of said cutter adapted to ride over the beet tops and to raise and lower said frame and cutter.

2. The structure set forth in claim 1, said rollers inclining outwardly away from each other, and means for positively rotating said rollers.

3. A beet harvesting machine having in combination, a cutter adapted to move adjacent the ground and sever the beet tops, a vertically movable frame carrying said cutter, said rollers secured to said frame adapted to travel, respectively, at each side of the beet row and engage the tops of the beets to gauge said cutter relatively to the beets, and means for positively positioning said rollers different distances apart.

4. A beet harvesting machine having in combination, a dish-shaped cutter having its axis disposed at an angle of 45 degrees, or less, to the horizontal, a central axle secured to said cutter and projecting rearwardly therefrom, a frame in which said axle is journaled extending upwardly from the rear of said cutter and forwardly thereover, and gearing carried by said frame for driving said axle and cutter.

5. The structure set forth in claim 4, a pair of rollers carried by said frame disposed in front of said cutter and spaced at each side of the lowest point thereof, and gearing carried by said frame for rotating said rollers.

6. A beet harvesting machine having in combination, a frame, a dish-shaped cutter having its concave side disposed forwardly and its axis disposed at an angle of 45 degrees or less to the horizontal, means for rotating said cutter, a pair of rollers carried by said frame in front of said cutter and at each side of the lowest point thereof, and means for varying the distance between the lowermost points of said cutter and rollers.

7. A beet harvester having in combination, a wheel-supported main frame, a shaft extending transversely adjacent the front end thereof, means for driving said shaft, an auxiliary frame hung on said shaft, a dish-shaped cutter having its concave side disposed forwardly and its axis disposed at an angle of 45 degrees or less to the horizontal and at an acute angle to the longitudinal axis of said main frame carried by said auxiliary frame, a shaft secured to and projecting axially and rearwardly from said cutter, a beveled gear on said shaft, a shaft journaled in the auxiliary frame and projecting upwardly at the rear of said cutter and having a gear at its lower end meshing with said beveled gear, a shaft extending longitudinally of said auxiliary frame above said cutter and connected at its ends, respectively, to said last mentioned shaft and to said first mentioned shaft whereby said cutter is positively driven.

8. The structure set forth in claim 7, a transverse shaft carried by said auxiliary frame in front of said cutter, spaced rollers in front of said cutter adapted to travel upon the ground and positively driven from said last mentioned shaft, a sprocket wheel on said last mentioned shaft, a chain passing thereover and driven by a sprocket wheel on said first mentioned shaft.

9. A beet harvesting machine having in combination, a wheel-supported main frame, a shaft extending transversely adjacent the front end thereof, an auxiliary frame hung on said shaft, a dish-shaped cutter carried by said auxiliary frame having its concave side disposed forwardly, means for rotating said cutter, a substantially horizontal shaft carried by said auxiliary frame forward of said cutter and driven from said first mentioned shaft, a pair of spaced rollers in front of said cutter adapted to travel on the ground, and a vertical shaft above each roller each geared at its upper end to said last mentioned shaft and at its lower end to one of said rollers.

10. A beet harvesting machine having in combination, a frame, an up-standing dish-shaped cutter carried thereby having its concave side directed forwardly, a pair of spaced rollers carried by said frame in front of said cutter adapted to contact with the beet tops, and a pair of rods extending substantially horizontally forwardly from the inner sides of said rollers and curved downwardly and outwardly at the front ends for lifting and moving inwardly depending beet tops.

11. The structure set forth in claim 10, a vertical shaft above each roller, said shafts rotating toward each other and carrying spaced arms for moving said beet tops inwardly.

12. A beet harvesting machine having in combination, a frame, an upstanding dish-shaped cutter carried thereby, adapted to sever the beet tops while the beet is still in the ground, a pair of rollers having axes extending transversely of said machine moving in front of said cutter and adjacent its lower edge adapted to ride over the beet tops and raise and lower said cutter, means for raising and moving inwardly depending beet tops, and means for moving the beet tops inwardly and rearwardly.

13. A beet harvesting machine having in combination, a vertically swinging frame, an upstanding dish-shaped cutter carried by said frame with its concave side disposed forwardly, means for rotating said cutter, a pair of spaced rollers in front of said cutter carried at each side of its lowermost point, means for positively rotating said rollers, a downwardly and outwardly curved rod adjacent the inside of each roller, said rods projecting forwardly beyond said rollers.

14. The structure set forth in claim 13, a vertical shaft extending upwardly from each roller and geared thereto for driving said roller, and radially extending arms on said shaft adjacent said roller for moving beet tops inwardly and rearwardly.

15. A beet harvesting machine having in combination, a cutter adapted to move adjacent the ground and sever the beet tops, a vertically movable frame carrying said cutter, a pair of rollers secured to said frame adapted to travel, respectively, at each side of the beet row and engage the tops of the beets to gauge said cutter relatively to the beets, and means for positively rotating said rollers.

16. A beet harvesting machine having in combination, a cutter adapted to move adjacent the ground and sever the beet tops, a vertically movable frame carrying said cutter, a pair of rollers secured to said frame adapted to travel, respectively, at each side of the beet row and engage the tops of the beets to gauge said cutter relatively to the beets, and means for securing said rollers in different positions relative to said frame.

17. A beet harvesting machine having in combination, a frame, a cutter carried thereby adapted to move adjacent the ground to sever the beet tops, a pair of spaced rollers carried by said frame adapted to travel, respectively, at each side of the beets and engage the tops of the beets to gauge said cutter relative to the beets, a pair of rods extending forwardly, downwardly and outwardly for lifting and moving inwardly depending beet tops, a vertical shaft above each roller said shafts rotating towards each other and carrying circumferentially spaced arms for moving said beet tops inwardly.

18. A beet harvesting machine having in combination, a frame, an upstanding dish-shaped cutter carried thereby having its concave side directed forwardly, revoluble means carried by said frame in front of said cutter adapted to contact with the beet tops to position said cutter relatively thereto, and means carried by said frame in advance of said first mentioned means for raising the beet tops and moving the same inwardly so that said tops will be out of the way of said first mentioned means and will be in proper position to be engaged and severed by said cutter.

In testimony whereof I affix my signature.

ADOLPH F. DJUBERG.